United States Patent
Zhang et al.

(10) Patent No.: US 11,222,217 B1
(45) Date of Patent: Jan. 11, 2022

(54) DETECTION METHOD USING FUSION NETWORK BASED ON ATTENTION MECHANISM, AND TERMINAL DEVICE

(71) Applicant: Tsinghua University, Beijing (CN)

(72) Inventors: Xinyu Zhang, Beijing (CN); Jun Li, Beijing (CN); Zhiwei Li, Beijing (CN); Qifan Tan, Beijing (CN); Li Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/369,990

(22) Filed: Jul. 8, 2021

(30) Foreign Application Priority Data

Aug. 14, 2020 (CN) .......................... 202010817467.0

(51) Int. Cl.
| | | |
|---|---|---|
| *G06K 9/00* | (2006.01) | |
| *G06K 9/62* | (2006.01) | |
| *G06N 3/08* | (2006.01) | |
| *G06K 9/44* | (2006.01) | |
| *G06N 3/04* | (2006.01) | |

(52) U.S. Cl.
CPC .......... *G06K 9/00798* (2013.01); *G06K 9/44* (2013.01); *G06K 9/6256* (2013.01); *G06K 9/6289* (2013.01); *G06N 3/0454* (2013.01); *G06N 3/08* (2013.01)

(58) Field of Classification Search
CPC ..... G06N 3/0454; G06N 3/08; G06K 9/00798
See application file for complete search history.

(56) References Cited

U.S. PATENT DOCUMENTS

| | | | |
|---|---|---|---|
| 10,929,694 B1* | 2/2021 | Zhang | G06K 9/6289 |
| 2017/0206464 A1* | 7/2017 | Clayton | G06N 3/0445 |
| 2019/0228268 A1* | 7/2019 | Zhang | G06N 3/0454 |
| 2020/0218909 A1* | 7/2020 | Myeong | G06K 9/00798 |
| 2021/0103027 A1* | 4/2021 | Harrison | G01S 13/931 |
| 2021/0287037 A1* | 9/2021 | Chen | G06K 9/00208 |

FOREIGN PATENT DOCUMENTS

| | | | |
|---|---|---|---|
| CN | 110929692 A | | 3/2020 |
| CN | 111222395 A | | 6/2020 |
| CN | 111523600 A | * | 8/2020 |
| CN | 111523600 A | | 8/2020 |

* cited by examiner

*Primary Examiner* — Ross Varndell
(74) *Attorney, Agent, or Firm* — Bayramoglu Law Offices LLC

(57) ABSTRACT

A lane line detection method using a fusion network based on an attention mechanism, and a terminal device are provided. The method includes: synchronously acquiring natural images and point cloud data of a road surface; and inputting the natural images and the point cloud data into a pre-built and trained fusion network to output a lane line detection result. Time series frames and an attention mechanism are added to the fusion network to perform information fusing on the point cloud data and the natural images. Specifically, continuous frames are used to improve detection network performance to deal with complex situations such as label loss and vehicle being blocked; low-dimensional features are stitched with high-dimensional features by Skip Connection to make up for image detail information that is continuously lost as the network goes deeper, and the Decoder module is used to restore image dimensions to obtain a final result.

8 Claims, 7 Drawing Sheets

DETECTION METHOD USING FUSION NETWORK BASED ON ATTENTION MECHANISM, AND TERMINAL DEVICE

CROSS REFERENCE TO THE RELATED APPLICATIONS

This application is based upon and claims priority to Chinese Patent Application No. 202010817467.0, filed on Aug. 14, 2020, the entire contents of which are incorporated herein by reference.

TECHNICAL FIELD

The present invention relates to the field of computer vision technology, in particular to a lane line detection method using a fusion network based on an attention mechanism, and a terminal device.

BACKGROUND

A lane line detection method is mainly applied to the field of autonomous driving. By identifying lane lines, a positional relationship between a vehicle and the current lane can be determined, and then judgment is performed to achieve the following functions: (1) lane departure warning, (2) lane keeping assist, (3) lane centering assist, and (4) auto lane change assist. A driver assistance system just uses a lane line detection result to provide a basis an autonomous driving control module, and the lane line detection result determines, to a great extent, the performance of the driver assistance system.

At present, lane line detection has become a hot spot in researches and applications by scholars at home and abroad, who have proposed many detection methods. Great breakthroughs have been achieved due to the rapid development of deep learning and its wide applications in various fields today. A deep learning model does not rely on manual extraction of features, and the model has high robustness and good detection performance, so currently, lane line detection methods based on deep learning have become the mainstream.

In recent years, many scholars have proposed many complicated lane line detection methods for a single image. However, due to limitations of the single image itself, the detection methods perform bad under harsh conditions, such as ghosting, label degeneration, and blocking.

With the rapid development of sensors, various sensors have better performance and cheaper prices, making it possible to fuse information from multiple sensors. Common sensors are visible light imaging systems and liar imaging systems. A visible light imaging system may lose image information under the conditions of low light and thick fog. A lidar can overcome the above-mentioned problems, but the sparseness of point clouds leads to very limited detection capability. Thus, a multi-sensor fusion method may be used to improve the performance of a lane line detection method.

Attention models have been widely used in various fields of deep learning in recent years, and attention models can be seen in various tasks of different types, whether for image processing, speech recognition, or natural language processing. An attentional model put mores focus on detailed information about a target and suppresses other useless information.

In the use of fused information, more information is involved, which requires more computational resources and time, and without a proper fusion method, more information may lead to data redundancy and overlap, which in turn leads to degradation of network performance. "How to fuse" to better use multi-sensor fused information to improve the performance of a fusion network will be the focus of the fusion network to be considered. The fused information differs greatly from sole information, but most of the existing attention models use natural image feature maps as an input, and thus their performance on fused information of point cloud data and natural image data is not good.

SUMMARY

An object of the present invention is to overcome the above-mentioned technical drawbacks, and provide a lane line detection method using a fusion network based on an attention mechanism, capable of improving the performance of lane line detection.

To achieve the above object, the present invention proposes a lane line detection method using a fusion network based on an attention mechanism, the method including:

synchronously acquiring natural images and point cloud data of a road surface; and inputting the natural images and the point cloud data into a pre-built and trained fusion network to output a lane line detection result, wherein time series frames and an attention mechanism are added to the fusion network to perform information fusing on the point cloud data and the natural images.

As an improvement of the above-mentioned method, the fusion network includes a fusion module, an Encoder module, a ConvLSTM module and a Decoder module;

the fusion module is configured to perform cross-channel fusion on the point cloud data and natural image data by embedding an attention model, and output fused feature maps to the Encoder module;

the Encoder module is configured to extract features of the feature maps generated by the fusion module, and output the extracted features to the ConvLSTM module;

the ConvLSTM module is configured to process the features output by the Encoder module by using a long and short-term memory network embedded with a convolutional neural network, and output the processed features to the Decoder module; and the Decoder module is configured to recover the size and resolution of a result map by upsampling, and fuse low-level features with high-level features by Skip Connection.

As an improvement of the above-mentioned method, the fusion module includes a point cloud branch, an image branch and a stitching unit; the point cloud branch includes a point cloud convolution layer, a point cloud global average pooling layer, a point cloud fusion unit, a point cloud sigmoid function and a point cloud Hadamard product unit; the image branch includes an image convolution layer, an image global average pooling layer, an image fusion unit, an image sigmoid function and an image Hadamard product unit;

the point cloud convolution layer is configured to keep the picture size unchanged and output a feature map R0, with a picture size of W*H, where W is a horizontal dimension and H is a vertical dimension, the feature map R0 including C channels;

the point cloud global average pooling layer is configured to calculate the average of sum for the C channels of the feature map R0 respectively, and output an average feature map of the point cloud data, the size of the average feature map being 1*1;

the point cloud fusion unit is configured to fuse the feature map output by the point cloud global average pooling layer with a feature map output by the image global average pooling layer at the same location and the same level to generate a fused feature map FRP1;

the point cloud sigmoid function is configured to input the generated fused feature map FRP1 into a Sigmoid excitation function to generate a feature map SFRP1;

The point cloud Hadamard product unit is configured to convert the size of the feature map SFRP1 to W*H, then calculate a Hadamard product with the feature map R0, and output a feature map1;

the image convolution layer is configured to keep the picture size unchanged and output C feature maps P0, with a picture size of W*H, the feature maps P0 including C channels;

the image global average pooling layer is configured to calculate the average of sum for the C channels of the feature map P0 respectively, and output an average feature map of image data, the size of the average feature map being 1*1;

the image fusion unit is configured to fuse the C feature maps output by the image global average pooling layer with feature maps output by the image global average pooling layer at the same location and the same level to generate a fused feature map FRP2;

the image sigmoid function is configured to generate a feature map SFRP2 from the generated fused feature map FRP2 by using a Sigmoid excitation function;

the image Hadamard product unit is configured to convert the size of the feature map SFRP2 to W*H, then calculate a Hadamard product with the feature map R0, and output a feature map2; and the stitching unit is configured to perform feature map channel stitching on feature map1 and feature map2 to form a feature map of a size W×H×2C as input to the Encoder module.

As an improvement of the above-mentioned method, a specific processing process of the point cloud fusion unit is:

for the $i^{th}$ channel of a point cloud fusion feature map, extracting feature maps of the $i^{th}$ to $(i+k)^{th}$ channels output by the point cloud global average pooling layer and feature maps of the $i^{th}$ to $(i+k)^{th}$ channels output by the image global average pooling layer, respectively, and performing fusion calculation to obtain a feature map of the $i^{th}$ channel of the point cloud fusion feature map, $$\sum_{j=1}^{k} w_r^j (y_r)_i^j + w_p^j (y_p)_i^j$$

where $y_r$ is a feature map output by the image global average pooling layer, including C channels with a structure of an end-to-end loop; $(y_r)_i^j$ represents a feature map of the $(i+j)^{th}$ channel; $y_p$ is a feature map output by the image global average pooling layer, including C channels with a structure of an end-to-end loop; $(y_p)_i^j$ represents a feature map of the $(i+j)^{th}$ channel; and $w_r^j$ represents a weight of the $j^{th}$ channel of the natural image, $w_p^j$ represents a weight of the $j^{th}$ channel of the point cloud data, i represents a feature map channel, $i \in [1,C]$, j represents the $j^{th}$ adjacent channel, and $j \in [1,k]$.

As an improvement of the above-mentioned method, the Encoder module includes three sequentially connected convolutional layers of the same structure: a first convolutional layer, a second convolutional layer and a third convolutional layer, each convolutional layer including a convolutional kernel with a size of 3 and a stride of 2, batch normalization, an activation layer, a convolutional kernel with a size of 3 and a stride of 1, and batch normalization and an activation layer, and a plurality of convolutional layers with a convolution kernel of a size of 3 and a stride of 2 are designed in an Encoder part with reference to a Unet network;

the Decoder module includes three sequentially connected convolutional layers of the same structure: a fourth convolutional layer, a fifth convolutional layer and a sixth convolutional layer, each convolutional layer including a convolutional kernel with a size of 3 and a stride of 1, batch normalization, an activation layer, a convolutional kernel with a size of 3 and a stride of 1, batch normalization, an activation layer and an upsampling layer;

features of the third convolutional layer are introduced into the fourth convolutional layer by Skip Connection; features of the second convolutional layer are introduced into the fifth convolutional layer by Skip Connection; and features of the first convolutional layer are introduced into the sixth convolutional layer by Skip Connection.

As an improvement of the above-mentioned method, the ConvLSTM module includes a ConvLSTM network and a storage unit, the ConvLSTM network being a long and short-term memory network embedded with a convolutional neural network;

a soft attention mechanism is added to an input side of the ConvLSTM network, as shown below:

$$Z_t = W_z \tanh(W_{xa} X_t + W_{ha} H_{t-1} + b_a) \tag{5}$$

$$A_t^{ij} = \frac{\exp(z_t^{ij})}{\sum_i \sum_j \exp(z_t^{ij})} \tag{6}$$

$$X_t' = A_t \circ X_t \tag{7}$$

where Xt represents an input to the ConvLSTM network at a time point t, Ht−1 represents a hidden state at a time point t−1, $W_z$, $W_{xa}$ and $W_{ha}$ all represent 2-D convolution kernels, and $b_a$ represents a bias term; Zt represents a generated two-dimensional matrix; $Z_t^{ij}$ represents the value of the $i^{th}$ row and the $j^{th}$ column in the matrix Zt, $A_t^{ij}$ represents the value of the $i^{th}$ row and the $j^{th}$ column of a two-dimensional score table, and $A_t$ represents the two-dimensional score table; $X_t'$ represents a new input to the ConvLSTM network at the time point t through the attention mechanism, exp represents an exponential function; tanh (·) represents a hyperbolic tangent nonlinearity; and "∘" represents a Hadamard product;

a soft attention mechanism is added to an output side of the ConvLSTM network to rebuild an output gate, as follows:

$$V_t = W_o * \tanh(W_{xo} * X_t + W_{ho} * H_{t-1} + b_o) \tag{8}$$

$$o_t = \left\{ \frac{\exp(V_t^{ij})}{\max_i^j \exp(V_t^{ij})} \right\} \tag{9}$$

where $o_t$ represents an output gate state; $W_{xo}$, $W_{ho}$, and $W_O$ all represent 2-D convolution kernels, $b_o$ represents a bias term, $V_t$ represents a two-dimensional matrix generated after an convolution operation, and $V_t^{ij}$ represents the value of the $i^{th}$ row and the $j^{th}$ column in the matrix $V_t$; and "*" represents convolution computation;

then activation of the ConvLSTM network at the time point t is denoted as:

$$i_t = \sigma(W_{xi} * X'_t + W_{hi} * H_{t-1} + b_i) \quad (10)$$

$$f_t = \sigma(W_{xf} * X'_t + W_{hf} * H_{t-1} + b_f)$$

$$o_t = \left\{ \frac{\exp(V_t^{ij})}{\max_i^j \exp(V_t^{ij})} \right\}$$

$$G_t = \tanh(W_{xc} * X'_t + W_{hc} * H_{t-1} + b_c)$$

$$C_t = f_t^\circ C_{t-1} + i_t^\circ G_t$$

$$H_t = o_t^\circ \tanh(C_t)$$

where $C_t$, $H_t$ and $C_{t-1}$, $H_{t-1}$ represent a cell state and a hidden state at the time points t and t−1, respectively; $i_t$, $f_t$ and $G_t$ represent an input gate state, a forget gate state and a candidate data storage unit, respectively; $W_{xi}$, $W_{hi}$, $W_{xf}$, $W_{hf}$, $W_{xc}$ and $W_{hc}$ all represent 2-D convolution kernels, $b_i$, $b_f$ and $b_c$ are a bias of the input gate, a bias of the forget gate and a bias of the candidate data storage unit, respectively; and $\sigma(\cdot)$ represents a Sigmoid operation; and the storage unit is configured to store feature maps of the last 5 frames of a scene.

As an improvement of the above-mentioned method, the method further includes a step of training the fusion network, specifically including:

creating a dataset containing natural images and point cloud data;

preprocessing the dataset, including: expanding a dataset of natural images by scale variation, random cutout, color variation and noise addition, and then performing data cleaning; and completing point cloud images in a dataset of point cloud data;

labeling the preprocessed dataset; and training parameters of the fusion network by using the labeled dataset to obtain a trained fusion network.

The present invention further provides a terminal device, including a memory, a processor, and a computer program stored in the memory and executable by the processor, wherein when executing the computer program, the processor executes the above-mentioned method.

The present invention further provides a storage medium, including a memory, a processor, and a computer program stored in the memory and executable by the processor, wherein when executing the computer program, the processor executes the above-mentioned method.

The present invention has the following advantages:

1. In the present invention, continuous frames are used to improve the detection network performance to deal with complex situations such as label loss and vehicle being blocked; finally, low-dimensional features are stitched with high-dimensional features by Skip Connection to make up for image detail information that is continuously lost as the network goes deeper, and the Decoder module is also used to restore the image dimensions to obtain a final result; and the fusion network greatly improves the detection performance for lane lines, and enables detection in various complex environments, such as label loss, severe weather, and blocking, thus achieving high robustness and stability.

2. In the fusion network of the present invention, cross-channel fusion is performed on the point cloud data and natural image data by embedding an attention model, which can improve the detection performance for small targets and better pay attention to lane lines 3. The fusion network of the present invention has fewer layers and can still maintain a fast detection speed in a lane line detection task achieving high accuracy.

DETAILED DESCRIPTION OF THE EMBODIMENTS

To make the objects, technical solutions and advantages of the present application clearer, the technical solutions of the present application will be described clearly and completely below in conjunction with the embodiments of the present application and the corresponding drawings. It shall be appreciated that the embodiments described are only part of the embodiments of the present application, and not all the embodiments. All other embodiments obtained by those of ordinary skill in the art without creative work, based on the embodiments in the present application, fall into the protection scope of the present application.

Second, the so called "one embodiment" or "an embodiment" here refers to a specific feature, structure, or characteristic that can be included in at least one implementation of the present invention. The expressions "in an embodiment" appearing in different places in this specification do not refer to the same embodiment, nor separate or selective embodiments that are mutually exclusive with other embodiments.

Most targets in a lane line detection task are small targets. An attention model not only can provide a good fusion idea, but also improves the degree of attention to the small targets, suppresses useless information, and greatly improves the performance of a fusion network. Therefore, it is proposed in the present invention to build a new fusion model in conjunction with an attention mechanism to promote the fusion of point cloud data and natural data, and enhance cross-channel information interaction. In addition, the present invention also improves ConvLSTM by adding space attention models to its input side and output gate to increase its learning ability for time series data and spatial features, better help lane line prediction of the current scene by previous scenes, and greatly reduce the number of parameters of ConvLSMT so that model learning and convergence are easy, and the operation speed is higher.

Figure 1:
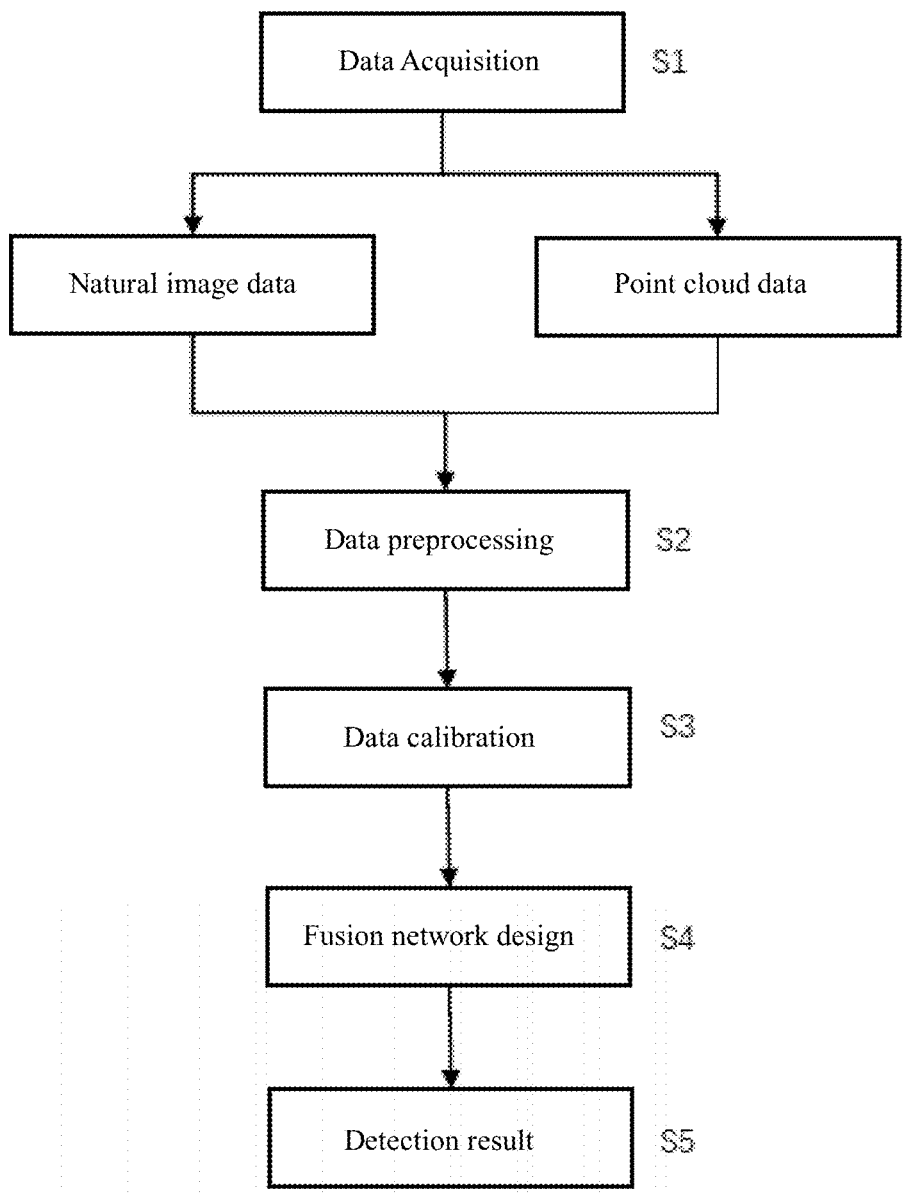
FIG. 1 is a flow diagram of a lane line detection method using a fusion network based on an attention mechanism provided in Embodiment 1 of the present invention.

As shown in FIG. 1, a lane line detection method using a fusion network based on an attention mechanism proposed in Embodiment 1 of the present invention includes detailed steps as follows:

S1: Collecting a Natural Image Dataset and a Point Cloud Dataset in a Same Scene Deep learning models greatly rely on datasets. Using an end-to-end based deep learning model certainly achieves many benefits, but it also requires larger datasets and stronger computational resources. Therefore, a natural image dataset and a point cloud dataset with a same scene are collected first. Since the collected datasets are often clearer and have less noises points than datasets obtained directly from a camera, if a fusion network is used for engineering experiments, it also needs to collect datasets again so that the fusion network can be fine-tuned on the datasets.

Datasets that have been collected so far are KITTI and AUDI. Both have high quality data, but their contents differ slightly from what is captured by the actual camera, depending on the type of camera mounted on the vehicle and its location. Lane line datasets obtained here are acquired in real time by a visible light camera and a liar mounted on a traveling vehicle. It is to be noted that the two types of sensors need to synchronously acquire data and reduce errors of acquiring a same scene. The performance of the fusion network depends heavily on the quality of the datasets, so visible light images and lidar point clouds in samples acquired here need to have lane lines that can be recognized more intuitively.

S2: Preprocessing Collected Data to Improve Data Quality

To improve the quality of the datasets, images are preprocessed, by data expansion, data cleaning, data auditing, and other methods. In data expansion, scale variation, random cutout, color variation, noise addition and other methods are used here to expand the datasets of data. In scale variation, the images are changed to (256, 128) till (512, 256), wherein the width is increased by 32 pixels at a time and the height is increased by 16 pixels at a time to increase the dataset and enable the network to adapt to picture inputs of different sizes. In random cutout, a portion is cut out from a middle part of the picture as far as possible, so that the cutout picture still contains many lane lines. In color variation, data enhancement is performed by adjusting hue and saturation. Image noise means that some interference information appears on an image due to interference by random signals during image acquisition or transmission. Here, datasets are expanded by adding Gaussian noise and salt and pepper noise.

In data cleaning, for data incompleteness and inaccuracy, data cleaning is performed for problematic "dirty data". For incomplete data and abnormal data, data rejection is performed to achieve a cleaning purpose. In dataset division, for a lane line detection model, datasets are divided into training sets, test sets, and validation sets in a ratio of 8:1:1, respectively, to alleviate the overfitting phenomenon.

The point cloud data is different from common image data, and is generated by scanning, and the acquired point cloud data is sparse considering that a beam emitted by a laser emitter is not returned or has exceeded a threshold value. To improve the performance of the fusion network, a method for completing point cloud images is used here.

Through observation, lane line data acquired by the vehicle is found to be generally located in the lower half of the picture, probably due to the mounting position of the vehicle-mounted camera, which is generally located directly in front of the vehicle and captures information on and above a road surface. The picture is cropped here to increase the display proportion of lane lines, and positive samples are increased appropriately to improve the performance of the fusion network.

S3: Labeling the Collected Datasets

In the lane line detection task, the fusion network operates based on supervised learning, so lane line calibration needs to be performed on the collected datasets. Data calibration is performed here on the visible light images, and obvious lane lines in the images are marked, while lane lines in the case where the vehicle is blocked or unclear, etc. are not calibrated.

In actual use, real-time detection is usually performed by installation on the vehicle, and road conditions of previous scenes are used to provide help for the current scene. Therefore, time series features are required for the datasets used here. Long videos are captured by the vehicle-mounted camera and lidar, and frame extraction is performed on the videos to generate pictures with time series signals. Considering the cost of labeling, more than 1000 sequences are marked in total, each sequence including 5 pictures, and the last picture of each sequence is labeled.

S4: Design and Implementation of the Fusion Network

Figure 2:
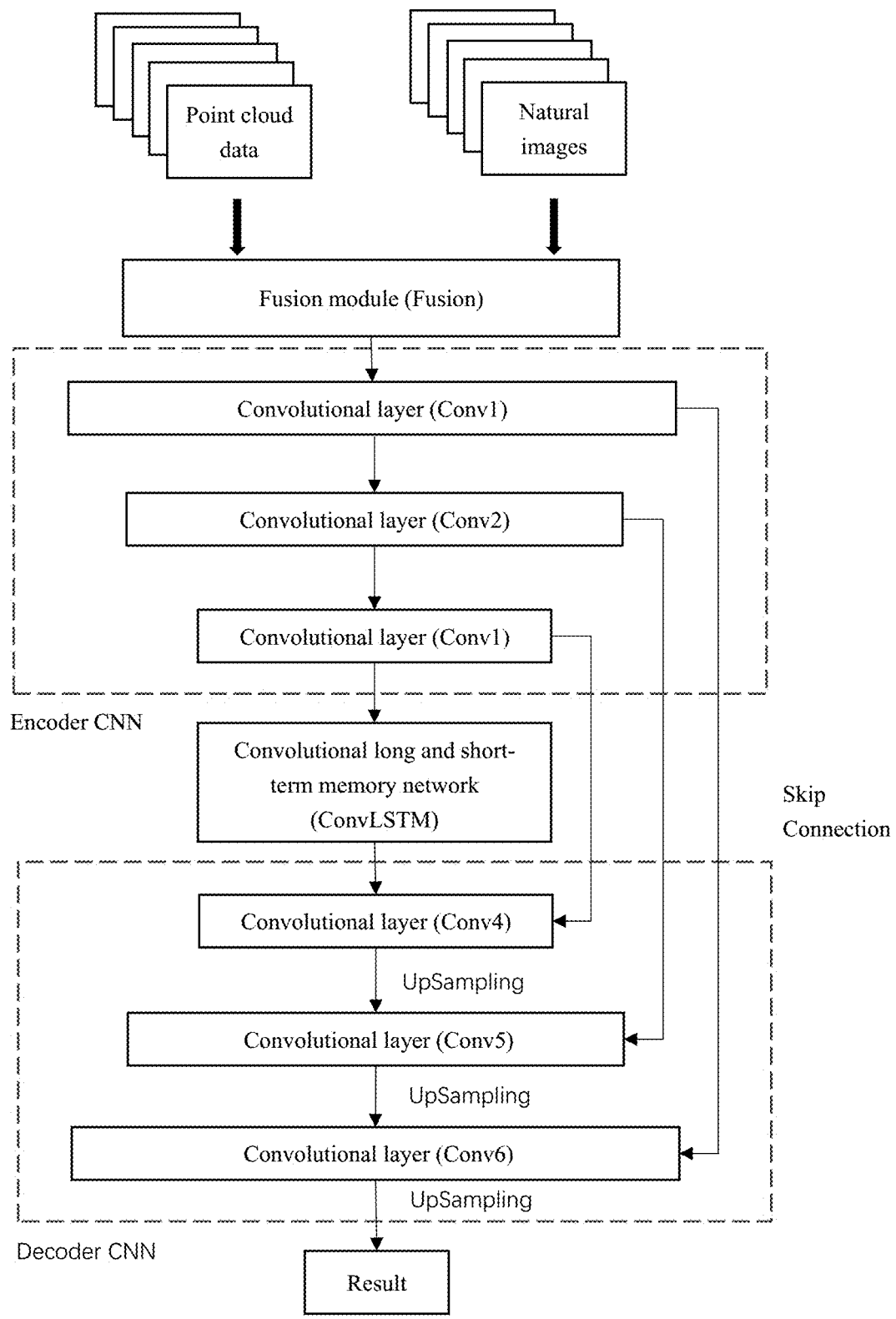
FIG. 2 shows a design structure of a fusion network provided in Embodiment 1 of the present invention.

To perform lane line detection on point clouds and natural images with time series signals and fused data, a fusion network architecture as shown in FIG. 2 is designed, which mainly includes: a fusion module, an Encoder module, a ConvLSTM module, and a Decoder module. The fusion module is used to better fusion point cloud data and natural image data, and configured to perform cross-channel fusion on the point cloud data and natural image data by embedding an attention model to improve the detection performance for small targets and better pay attention to lane lines. The Encoder module is configured to extract features of a feature map generated by the fusion module, and is implemented by a plurality of convolutional layers with a stride of 2. The ConvLSTM module is configured to detect the lane lines by using continuous driving scenes, with scenes of previous frames providing effective help for the detection of the current scene. Thus, continuous frames are used here to improve the detection performance of a lane line network and overcome the problems of double shadows, blocking and the like caused by using a single frame scene. The Decoder module is configured to recover the size and resolution of a result map by upsampling, and fuse low-level features with high-level features by Skip Connection, so that the network can retain more high-resolution detailed information contained in high-level feature maps, thereby greatly improving the detection performance for lane lines.

(1) Fusion Module

To better fuse the point cloud data and the natural image data, a fusion module is proposed here, in which an attention model is embedded to better pay attention to lane lines, generate a focus of attention among a lot of fused information and suppress useless information, thereby improving the performance and increasing the network speed. The fusion module performs cross-channel fusion of point clouds and natural images to increase the interaction of fused information so that the fused information can be used better, and the detection performance for small targets is improved greatly, which is more conducive to lane line detection. It enhances the fused information to a great extent and better changes channel weights to generate an attention focus and improve the performance of the lane line detection network.

A new feature map is generated by each convolution kernel. The number of convolutional kernels determines how many feature maps are generated by convolution. For convenience of subsequent description, the number of convolutional kernels in each convolutional layer is called the number of channels.

Figure 3:
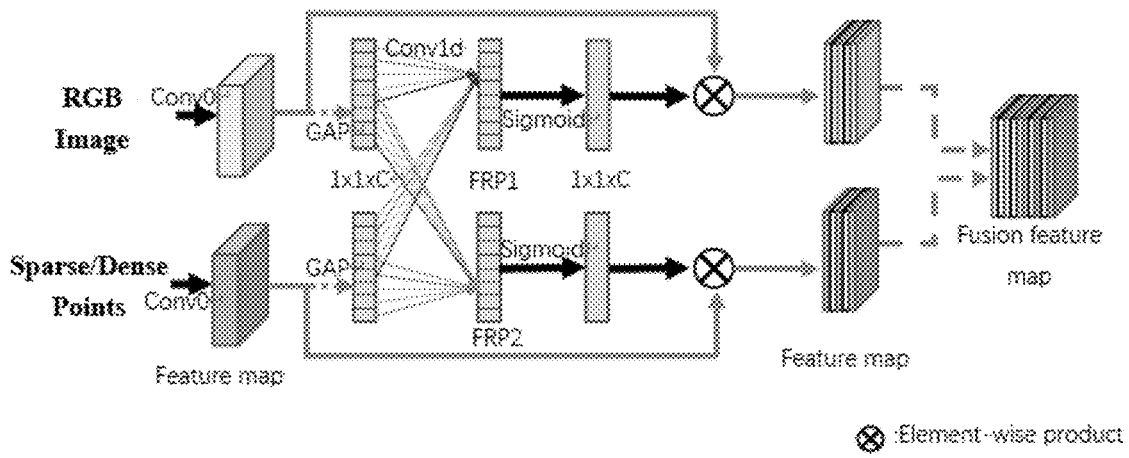
FIG. 3 is a structure diagram of the fusion network provided in Embodiment 1 of the present invention.

The structure of the fusion module is shown in FIG. 3. For the natural image data and point cloud data, a dual-branch fusion structure is used for channel weight update. First, the dual branches are processed by the convolutional layer Conv0 respectively, with the image size unchanged, set as W×H, and the number of channels changed to C, to generate feature maps R0 and P0, respectively, with a size of W×H×C, and then the average of sum is calculated for the feature maps of each channel by global average pooling (GAP) to obtain average feature maps of the respective channels, wherein the sizes of the resulting feature maps are 1×1×C. The computation of fused feature maps FRP1 and FRP2 requires the use of the feature maps at the same location and the same level of the other branch. The feature maps of the two branches after GAP are then processed by one-dimensional convolution Conv1$d$ to generate the fused feature maps, FRP1 and FPR2, respectively, still with a size of 1×1×C. The generated fused feature maps FRP1 and FRP2 are processed by a Sigmoid excitation function to generate SFRP1 and SFRP2, still with a size of 1×1×C. To reduce the loss of detailed features, Hadamard products are calculated between the feature maps R0 and P0 and the feature maps of SFRP1 and SFRP2, respectively, to obtain feature map1 and feature map2. It is to be noted that SFRP1 and SFRP2 need to be changed to feature maps of the same size as R0 and P0 by expanding the size of 1×1 to W×H, wherein all values are same. Finally, feature map channel stitching is performed on feature map1 and feature map2 to form a feature map with a size of W×H×2C, as input to the Encoder stage.

A specific process of generating SFRP1 and SFRP2 is as follows. The size of the feature maps of the first branch and the second branch after GAP are both 1×1×C, and if the size of the adaptive convolution kernel is k (which is 5 in this embodiment), calculation for the first channel of the fused feature map of the first branch needs to be performed by jointly extracting the first to the $k^{th}$ channels of the two branches, and calculation for the second channel needs to be calculated by jointly extracting the second to the $(k+1)^{th}$ channels of the two branches, and the weights of the second branch and the other channels are calculated by rules similar to the above ones. Through the above operation, the fused feature maps FRP1 and FRP2 can be generated, which are then processed by the Sigmoid function, so that the weights of the channel can be updated. A detailed calculation process of channel weight update is shown in the following equation:

$$w_{mi} = \sigma\left(\sum_{j=1}^{k} w_r^j (y_r)_i^j + w_p^j (y_p)_i^j\right) \quad (1)$$

where m represents a fused feature map, m with a value 1 represents FRP1, m with a value 2 represents FRP2, i represents a feature map channel, i∈[1,C], j represents the $j^{th}$ adjacent channel, j∈[1,k], $y_r$ represents a natural image channel, $y_p$ represents a point cloud data channel, k represents the number of adjacent channels, σ represents a sigmoid function, $w_r$ represents a weight of a natural image channel, $w_p$ represents a weight of a point cloud data channel, and $w_{mi}$ represents a weight of the $i^{th}$ channel of the fused feature map. According to equation (1), the weight of $y_i$ is calculated by considering only the interrelationship between $y_i$ and k adjacent channels, and the channel weight of $y_i$ is updated to the new weight $w_i$. It should be noted that the calculation of the weights of the $i^{th}$ channels of the dual branches are related to the adjacent channels of the dual branches, which expands the interaction of fused information compared to the original channel attention model and makes more full use of the advantages of natural image data and point cloud data.

The fusion module performs cross-channel fusion of the point clouds and natural images, so that the detection performance for small targets is improved greatly, which is more conducive to lane line detection. Due to the use the point cloud data and natural images and the dual-branch network structure, large computational resources and storage space are required. Finally, an element-wise product is calculated between the input and the output of the attention model to obtain an output result of the entire channel attention model.

By using the channel attention model with local cross-channel interaction without dimensionality reduction, the performance of the fusion network is greatly improved, and the detection of lane lines is more accurate; and the fusion model is a compromise between complexity and performance with few parameters and is very handy.

(2) Encoder-Decoder Structure

Figure 4:
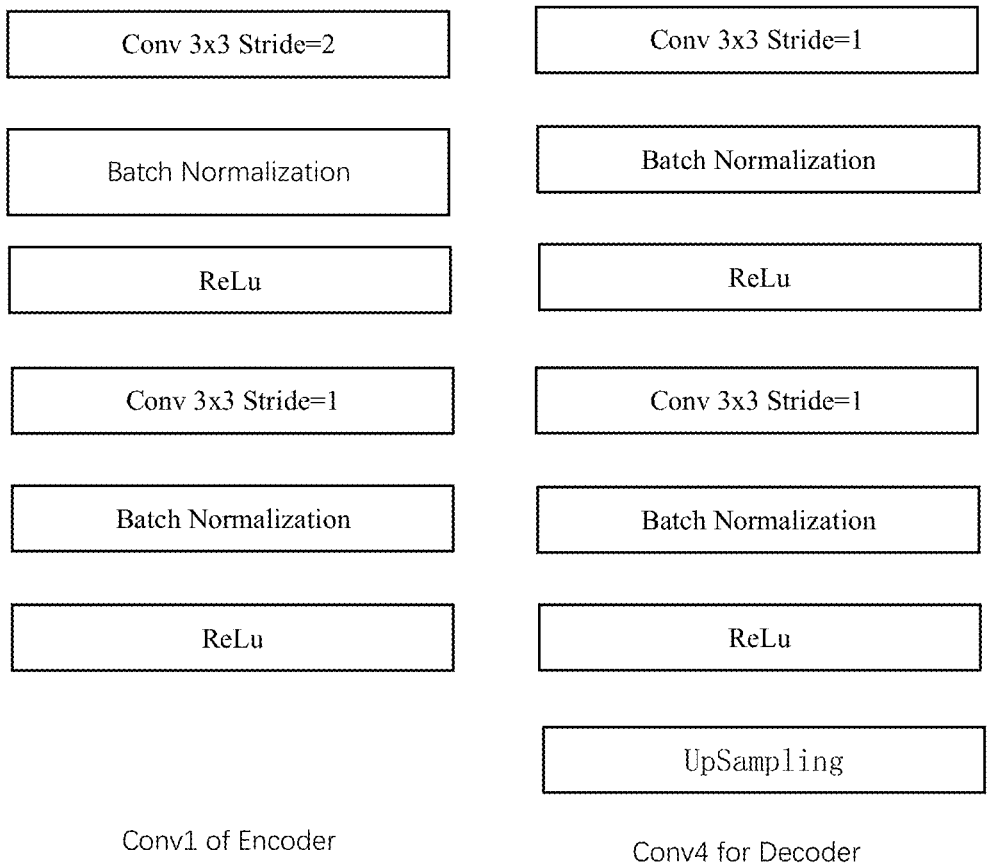
FIG. 4 is a structure diagram of convolutional layers of Encoder and Decoder provided in embodiment 1 of the present invention.

The Encoder-Decoder structure is a very common framework in deep learning, and is widely used in scenes of natural language processing (NLP), unsupervised learning, semantic segmentation and the like. The Encoder and Decoder parts may process any text, speech, image, video and other data, and the model may be CNN, RNN, LSTM, or the like, so various application algorithms may be designed based on the Encoder-Decoder structure. In the present application, a dual-layer convolutional layer is as a basic unit of a basic network model, and a channel attention mechanism is added to the Encoder part to change the influence factor of different inputs on the intermediate semantics, and a ConvLSTM module is added between the Encoder and Decoder parts. The detailed implementation of Encoder-Decoder is shown in FIG. 4.

The Encoder module is mainly composed of a convolutional layer (conv), batch normalization (BN), an activation layer (ReLu), and an attention model (attention). In the Encoder part, a plurality of convolutional layers with a convolution kernel of a size of 3 and a stride of 2 are designed with reference to a Unet network, and the function of downsampling is achieved by a convolutional layer with a stride of 2. In forward propagation of the Encoder, the size of an image is reduced by half and the number of channels is doubled for each convolutional layer to reduce the loss of information. Feature extraction and downsampling are performed by multiple smaller convolutional kernels to generate intermediate semantics, and then information is recovered by the Decoder.

The Decoder module is mainly composed of a convolutional layer (conv), batch normalization (BN), an activation layer (ReLu), and an upsampling layer (UpSampling). In the Decoder part, the image size is also recovered by a convolutional layer with a convolutional kernel size of 3 and then by a upsampling layer. It should be noted that the BN layer always follows the Conv layer to speed up the training and improve the generalization ability of the network.

For the lane line detection task, spatial domain information is very important. The Encoder part uses a convolutional layer with a stride of 2 to perform downsampling, which reduces the resolution of the feature map to a very small size and is not conducive to accurate lane line detection. Shallow convolutional layer features can be introduced by Skip Connection, and the feature maps have high resolution and shallow layers, contain rich low-level information, which is more conducive to lane line detection. By fusing low-level features with high-level features, the network can retain more high-resolution detailed information contained in high-level feature maps, thereby greatly improving the accuracy of image segmentation.

As the network goes deeper, the corresponding feature maps are smaller and the perception gets greater, but the retained detail information is less. For the semantic segmentation task, the rich detail information retained by the low-level convolution is very useful, because low-dimensional and high-dimensional features are fused by Skip Connection to improve the lane line detection performance. In addition, this connection can effectively reduce gradient vanishing and network degeneration problems, making training easier.

(3) ConvLSTM Module

Lane lines are usually solid or dashed line structures. A lane line detection model of for a single picture has poor performance under the conditions of double shadows, severe label degeneration, and severe blocking of the vehicle, mainly due to insufficient information in the single picture. Therefore, lane line detection by using continuous driving scenes is considered in the hope of using scenes from previous frames to provide useful help to the current scene, so continuous frames are used here to increase the detection performance of the lane line network. The LSTM network with convolutional operations is very effective for time series information prediction and significantly improves detection performance in a semantic segmentation framework. In addition, ConvLSTM is also improved here by adding different types of attention model to its input side and output gate to increase its learning ability for time series data and spatial features, better help lane line prediction of the current scene by previous scenes, and greatly reduce the number of parameters of ConvLSMT so that model learning and convergence are easy, and the operation speed is higher. In addition, a storage module is added to ConvLSTM so that it can retain the last 5 frames of the scene to reduce repetitive computation and improve the speed of lane line detection.

Figure 5:
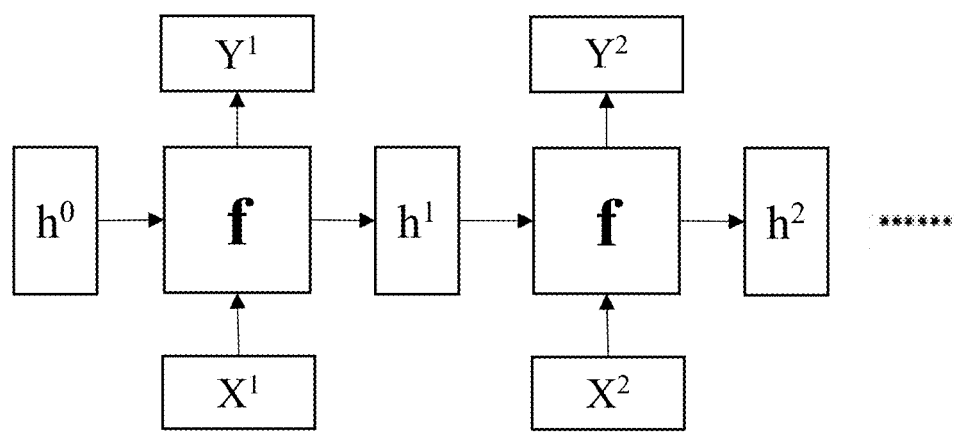
FIG. 5 is a structure diagram of an RNN provided in Embodiment 1 of the present invention.

A recurrent neural network (RNN) is a neural network for processing sequential data. It contains a feedback input compared to previous neurons, and expands over time, as shown in FIG. 5, and may be expressed by the following equation:

$$h',y=f(h,x) \quad (2)$$

where f represents a mapping function to be learned, h represents an input of the previous node, x represents a data input of the current node, y represents a data output of the current node, and h' represents an output passed to the next node. Information of a neuron at the previous time point is connected to a neuron at the next time point, i.e., the following neuron can refer to "historical information" of the previous neuron, thus processing the time series features efficiently.

Figure 6:
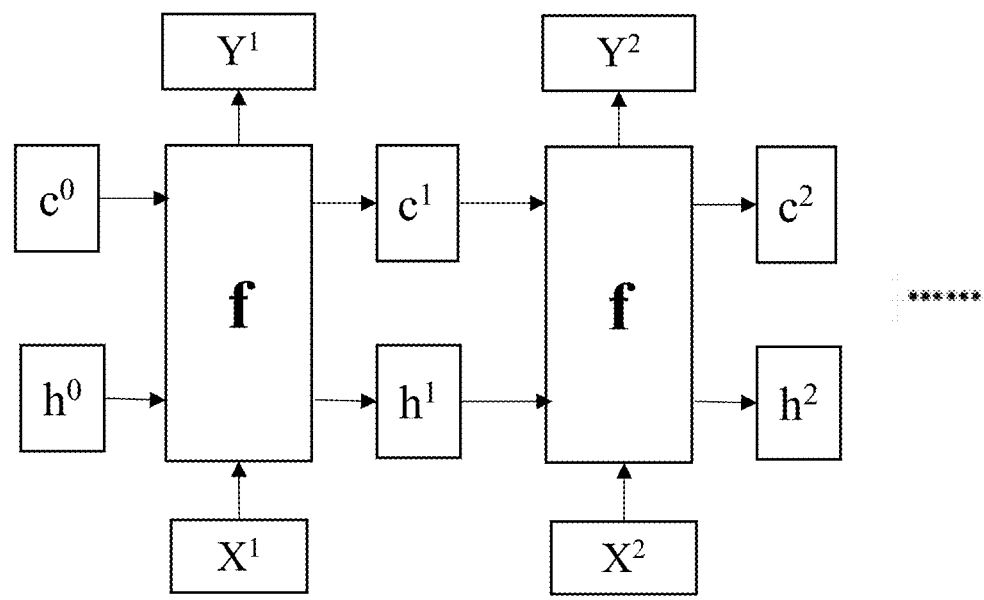
FIG. 6 is a structure diagram of an LSTM provided in Embodiment 1 of the present invention.

A long and short-term memory network (LSTM) is a special RNN, mainly to solve the gradient vanishing and gradient exploding problems during long sequence training. Compared with a common RNN, the LSTM can have more performance in longer sequences and mitigate the problem of time series feature loss as the number of network layers increases. The structure of the LSTM is shown in FIG. 6. Compared with a RNN that has only one passing state $h^t$, the LSTM has two passing states, $C^t$ (cell state) and $H^t$ (hidden state), wherein the passed $C^t$ changes very slowly while the IF differs greatly at different nodes. The LSTM is trained by stitching the current input $X^t$ with $H^{t-1}$ passed from the previous state to obtain four states, as shown in the following equation:

$$G_t = \tanh(w[X^t; H^{t-1}])$$

$$i_t = \sigma(w^i[X^t; H^{t-1}])$$

$$f_t = \sigma(w^f[X^t; H^{t-1}])$$

$$z_o = \sigma(w^o[X^t; H^{t-1}]) \quad (3)$$

where w, $w^i$, $w^f$ and $w^o$ represent a weight matrix, [a,b] represents stitching a and b, tanh represents an activation function, represents a sigmoid activation function, and $G_t$, $i_t$, $f_t$ and $O_t$ represent input data and three gating states (memory gate, forget gate, and output gate). σ With the above gating states, $C^t$, $H^t$ and $y^t$ of the current node can be calculated, and the following equation shows a specific calculation process:

$$C^t = f_t \odot C_{t-1} + i_t \odot G_t$$

$$H^t = o_t \odot \tanh(c^t)$$

$$y^t = \sigma(W'H^t) \quad (4)$$

where ⊙ represents multiplication of operation matrix elements, and ⊕ represents matrix addition.

The LSTM includes three stages: a forgetting stage mainly for selectively forgetting information passed from the previous node, specifically using $f_t$ to control the forgetting gating; a memory stage mainly for selectively "remembering" the input of this node, specifically using $i_t$ to control the memory gating; and an output stage mainly for deciding which information is used as an output of the current state, specifically using $o_t$ to control the output gating.

The LSTM has very good performance for time series data, which is usually text information linked by context, but if the time series data is images, convolutional operations need to be added to the LSTM to extract more effective time series features and spatial features, thus forming a ConvLSTM.

The ConvLSTM has a feedback mechanism on temporal dynamics and abstraction capability for image representations, and is widely used in video analysis. A DCNN abstracts each image frame into a low-dimensional feature map, and the ConvLSTM uses each feature map as a fully connected layer on a timeline and recursively detects lane lines. The ConvLSTM network is very effective for time series information prediction and significantly improves detection performance in a semantic segmentation framework.

Figure 7:
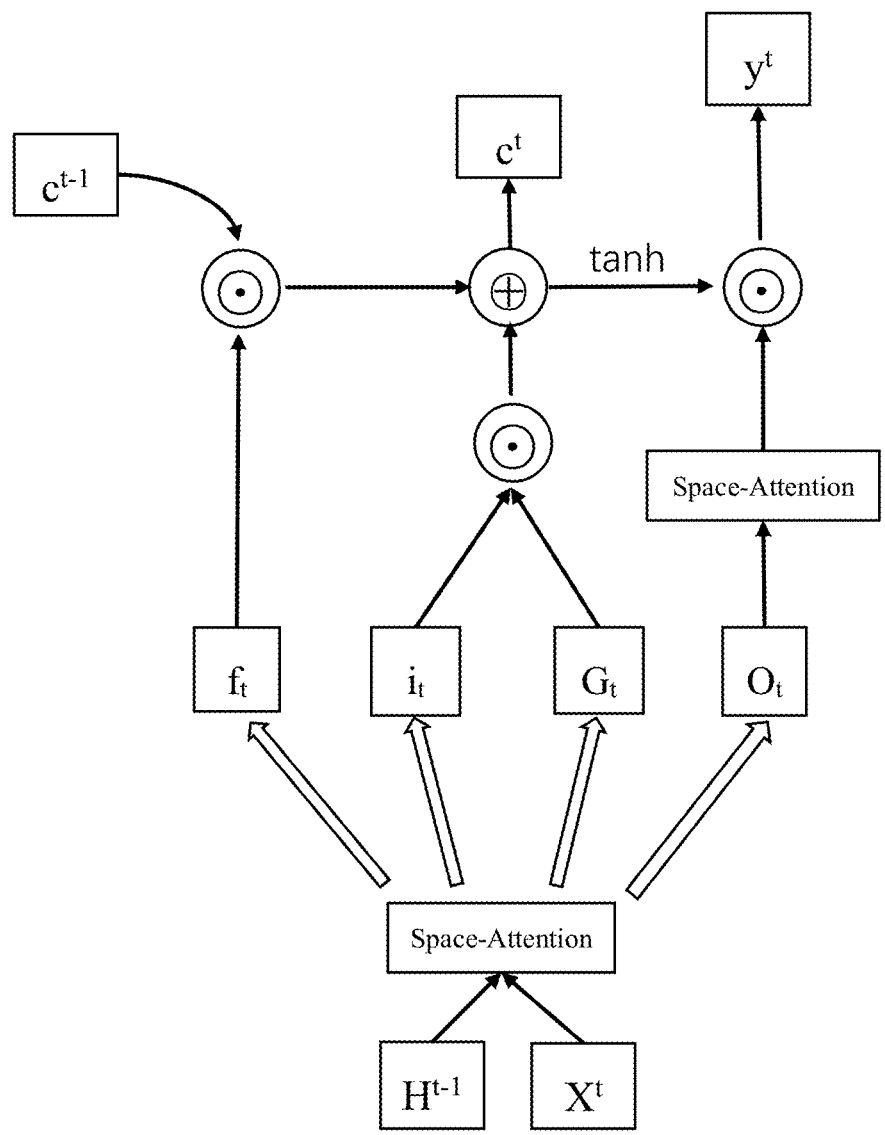
FIG. 7 is a detailed implementation diagram of an ConvLSTM added with an attention mechanism provided in Embodiment 1 of the present invention.

The three gates of the ConvLSTM do not promote spatio-temporal feature fusion, and the convolutional structure thereof is redundant, and the ConvLSTM has a large number of parameters, which leads to a high learning cost and requires a lot of computational resources and time. Considering a focus on the spatial region by virtue of different gating values in the spatial domain, so the ConvLSTM is improved here. A space attention mechanism is added to the input side and the output gate of the ConvLSTM, to enhance the attention to a channel of interest.

a soft attention mechanism is added to an input side of the ConvLSTM network, as shown below:

$$Z_t = W_z \tanh(W_{xa} X_t + W_{ha} H_{t-1} + b_a) \quad (5)$$

$$A_t^{ij} = \frac{\exp(z_t^{ij})}{\sum_i \sum_j \exp(z_t^{ij})} \quad (6)$$

$$X_t' = A_t \circ X_t \quad (7)$$

where Xt represents an input to the ConvLSTM network at a time point t, Ht−1 represents a hidden state at a time point t−1, $W_z$, $W_{xa}$ and $W_{ha}$ all represent 2-D convolution kernels, and $b_a$ represents a bias term; $Z_t$ represents a generated two-dimensional matrix; $Z_t^{ij}$ represents the value of the $i^{th}$ row and the $j^{th}$ column in the matrix Zt, $A_t^{ij}$ represents the value of the $i^{th}$ row and the $j^{th}$ column of a two-dimensional score table, and $A_t$ represents the two-dimensional score table; $X_t'$ represents a new input to the ConvLSTM network at the time point t through the attention mechanism, exp represents an exponential function; tanh (·) represents a hyperbolic tangent nonlinearity; and "∘" represents a Hadamard product;

a soft attention mechanism is added to an output side of the ConvLSTM network to rebuild an output gate, as follows:

$$V_t = W_o \tanh(W_{xo} * X_t + W_{ho} * H_{t-1} + b_o) \quad (8)$$

$$o_t = \left\{ \frac{\exp(V_t^{ij})}{\max_i^j \exp(V_t^{ij})} \right\} \quad (9)$$

where $o_t$ represents an output gate state; $W_{xo}$, $W_{ho}$ and $W_o$ all represent 2-D convolution kernels, $b_o$ represents a bias term, $V_t$ represents a two-dimensional matrix generated after an convolution operation, and $V_t^{ij}$ represents the value of the $i^{th}$ row and the $j^{th}$ column in the matrix $V_t$; and "*" represents convolution computation;

then activation of the ConvLSTM network at the time point t is denoted as:

$$i_t = \sigma(W_{xi} * X_t' + W_{hi} * H_{t-1} + b_i) \quad (10)$$
$$f_t = \sigma(W_{xf} * X_t' + W_{hf} * H_{t-1} + b_f)$$
$$o_t = \left\{ \frac{\exp(V_t^{ij})}{\max_i^j \exp(V_t^{ij})} \right\}$$
$$G_t = \tanh(W_{xc} * X_t' + W_{hc} * H_{t-1} + b_c)$$
$$C_t = f_t \circ C_{t-1} + i_t \circ G_t$$
$$H_t = o_t \circ \tanh(C_t)$$

where $C_t$, $H_t$ and $C_{t-1}$, $H_{t-1}$ represent a cell state and a hidden state at the time points t and t−1, respectively; $i_t$, $f_t$ and $G_t$ represent an input gate state, a forget gate state and a candidate data storage unit, respectively; $W_{xi}$, $W_{hi}$, $W_{xf}$, $W_{hf}$, $W_{xc}$ and $W_{hc}$ all represent 2-D convolution kernels, $b_i$, $b_f$ and $b_c$ are a bias of the input gate, a bias of the forget gate and a bias of the candidate data storage unit, respectively; and σ (·) represents a Sigmoid operation. A detailed calculation process is shown in FIG. 7.

Considering that in an actual engineering experiment, lane lines need to be detected in real time, and the current scene is related to scenes of the previous 5 frames, but calculating feature maps of the scenes of the previous 5 frames each time leads to a phenomenon of repeated calculation, which wastes a lot of computing resources and slow down the speed of an algorithm to a great extent. For example, calculation for the scene of the 6th frame needs to use the scenes of the 1st, 2nd, 3rd, 4th, and 5th frames, while in the 7th frame, it needs to use the scenes of the 2nd, 3rd, 4th, 5th, and 6th frames, wherein some scenes are repeatedly calculated, leading to a phenomenon of wasting computing resources and reducing the calculation speed. The real-time requirement is high in lane line detection, the ConvLSTM structure is improved here.

Figure 8:
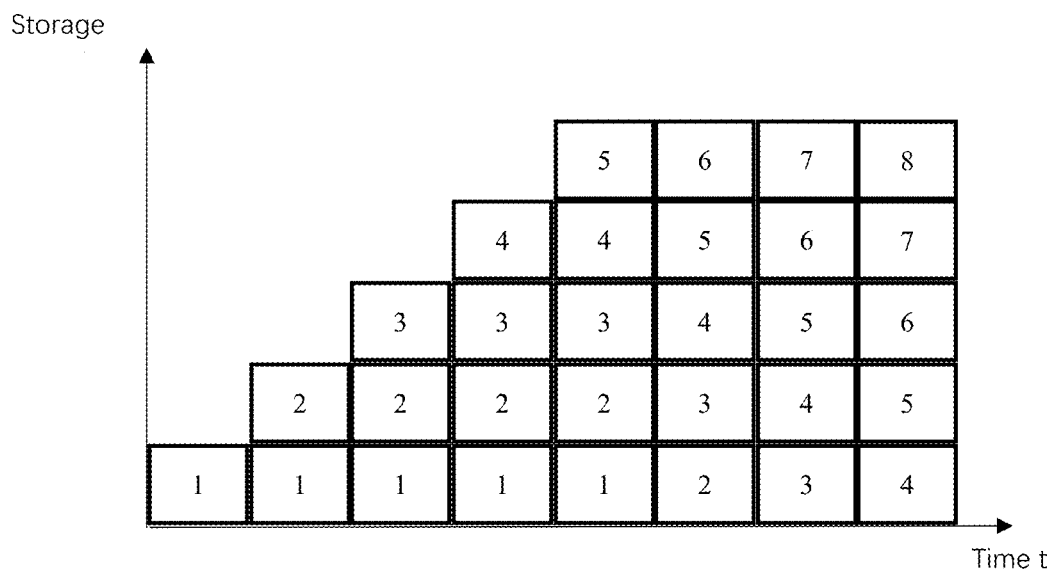
FIG. 8 shows a data storage example graph of the ConvLSTM provided in Embodiment 1 of the present invention.

The ConvLSTM structure is added with another storage unit that changes over time, which can store feature maps of the last 5 frames of scenes at a time, so that the required feature maps can be quickly recalled for use in the current scene. As shown in FIG. 8, in an assembly-line-like operation, only the feature map of the current scene needs to be calculated each time, which greatly increases the detection speed of lane lines.

S5: Lane Line Detection Using the Fusion Network

Figure 9:
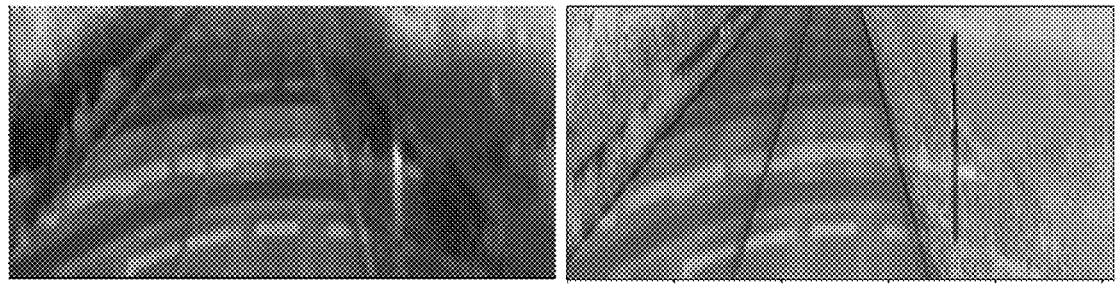
FIG. 9 is a comparison diagram of detection results of a fusion network without an attention mechanism and a fusion network added with an attention mechanism.
Figure 10:
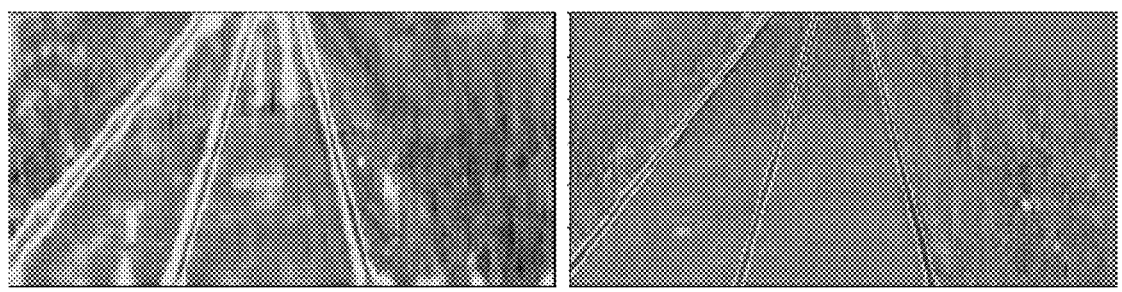
FIG. 10 is another comparison diagram of detection results of a fusion network without an attention mechanism and a fusion network added with an attention mechanism.

In the input of the fusion network, completed point cloud data and natural images with time series signals are input to the fusion structure, and the well-designed fusion structure is used to enhance information interaction, and then a result is output to the Encoder structure. Experiments prove that adding the fusion module achieves better performance improvement for lane line detection, as shown in FIGS. 9 and 10, which are feature maps of the last two layers of the fusion network, wherein a left picture shows a detection result obtained without adding the fusion module, and a right picture shows a detection result obtained by using the fusion network. By comparing the left and right pictures, it can be seen clearly that with the addition of the fusion module, detail features of the feature maps are more obvious and there are less noise points near the lane lines, making lane line detection easier.

The Encoder part uses a plurality of dual-layer convolutional layers with a basic unit of 3×3, the first convolutional layer having a stride of 2, to achieve downsampling. Feature maps of the Encoder part are input to the ConvLSTM network again.

Figure 11:
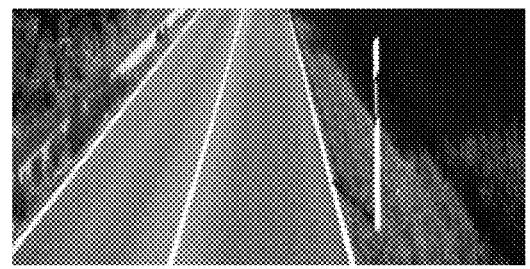
FIG. 11 is a road image provided in the present invention.
Figure 12:
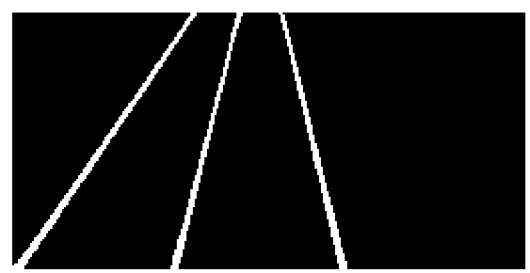
FIG. 12 is a detection result map of a fusion network provided in the present invention.

In the ConvLSTM network, continuous frames are used to improve the detection network performance to deal with complex situations such as label loss and vehicle being blocked. Finally, low-dimensional features are stitched with high-dimensional features by Skip Connection to make up for image detail information that is continuously lost as the network goes deeper, making network training easier, and the Decoder module is also used to restore the image dimensions to obtain a final result. For convenience of observation, FIG. 11 shows a road map, and FIG. 12 shows a detection result of FIG. 11. It can be seen that the detection result is good.

In the present invention, information fusion is performed on point clouds and images by the fusion module, and time series frames and a space attention mechanism are added thereto, making lane line detection more efficient and accurate. In the field of autonomous driving, a lane line detection task is particularly important, and the method has wider applications, and is also useful as a reference for other fields.

Embodiment 2

Embodiment 2 of the present invention discloses a lane line detection system using a fusion network based on an attention mechanism, the system including:

a data acquisition module configured to synchronously acquire natural images and point cloud data of a road surface; and a lane line monitoring module configured to input the natural images and the point cloud data into a pre-built and trained fusion network to output a lane line detection result, wherein time series frames and an attention mechanism are added to the fusion network to perform information fusing on the point cloud data and the natural images.

Embodiment 3

Figure 13:
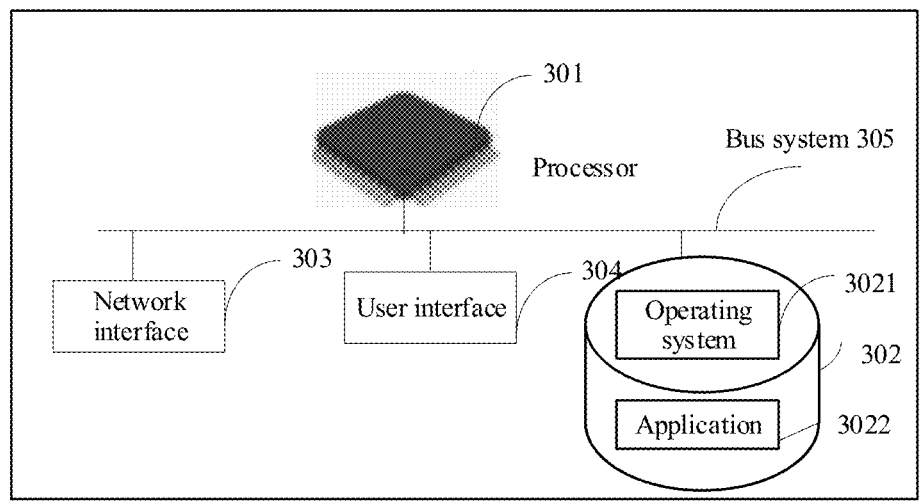
FIG. 13 is a schematic diagram of a terminal device provided in Embodiment 3 of the present invention.

As shown in FIG. 13, Embodiment 3 of the present invention provides a terminal device, which includes at least one processor 301, a memory 302, at least one network interface 303, and a user interface 304. The components are coupled together via a bus system 305. It may be understood that the bus system 305 is configured to implement connection communication between these components. The bus system 305 includes a power bus, a control bus, and a status signal bus in addition to a data bus. However, for the sake of clarity, the various buses are marked as the bus system 305 in the diagram.

The user interface 304 may include a display, a keyboard, or a clicking device (e.g., a mouse, a track ball, a touch pad, or a touch screen).

It may be understood that the memory 302 in embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be random access memory (RAM), which is used as an external cache. By way of exemplary but not restrictive description, many forms of RAMs may be used, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), and a direct Rambus RAM (DRRAM). The memory 302 described herein is intended to include, but is not limited to, these and any other suitable types of memory.

In some implementations, the memory 302 stores the following elements, executable modules or data structures, or a subset thereof, or an extended set thereof: an operating system 3021 and an application 3022.

The operating system 3021 contains various system programs, such as a framework layer, a core library layer, and a driver layer, for implementing various basic services and performing hardware-based tasks. The application 3022 contains various applications, such as a media player, and a browser, for implementing various application services. A program for implementing the method of embodiments of the present disclosure may be included in the application 3022.

In embodiments of the present disclosure, by calling a program or instructions stored in the memory 302, which may specifically be a program or instructions stored in the application 3022, the processor 301 is configured to:

execute the steps of the method of Embodiment 1.

The method of Embodiment 1 may be applied in the processor 301 or implemented by the processor 301. The processor 301 may be an integrated circuit chip with signal processing capability. During implementation, the steps of the above-mentioned method may be accomplished by an integrated logic circuit in the form of hardware or instructions in the form of software in the processor 301. The above-mentioned processor 301 may be a general-purpose processor, a digital signal processor (DSP), an application specific integrated circuit (ASIC), a field programmable gate array (FPGA) or other programmable logic device, a discrete gate or transistor logic device, or a discrete hardware component. The various methods, steps and logical block diagrams disclosed in Embodiment 1 may be implemented or executed. The general-purpose processor may be a microprocessor, or the processor may also be any conventional processor or the like. The steps of the method disclosed in conjunction with Embodiment 1 may be directly embodied in hardware and executed by a decoding processor, or executed by a combination of hardware and software modules in a decoding processor. The software module may be in a storage medium mature in the art, such as a random memory, a flash memory, a read-only memory, a programmable read-only memory or electrically erasable programmable memory, or a register. The storage medium is in the memory 302, and the processor 301 reads information in the memory 302 and accomplishes the steps of the above-mentioned method in conjunction with hardware thereof.

It may be understood that these embodiments described in the present invention may be implemented with hardware, software, firmware, middleware, microcodes, or a combination thereof. For hardware implementation, the processing unit may be implemented in one or more application specific integrated circuits (ASICs), digital signal processors (DSPs), digital signal processing devices (DSP Devices, DSPDs), programmable logic devices (PLDs), field-programmable gate arrays (FPGAs), general-purpose processors, controllers, microprocessors, microcontrollers, other electronic units for performing the functions described in the present application, or a combination thereof.

For software implementation, the technology of the present invention may be implemented by executing functional modules (e.g. processes, and functions) of the present invention. Software codes may be stored in the memory and executed by the processor. The memory may be implemented in the processor or outside the processor.

Embodiment 4

Embodiment 4 of the present invention provides a non-volatile storage medium configured to store a computer program. When the computer program is executed by the processor, the steps in the method in embodiment 1 may be implemented.

Finally, it should be noted that the above embodiments are only used for describing instead of limiting the technical solutions of the present invention. Although the present invention is described in detail with reference to the embodiments, persons of ordinary skill in the art should understand that modifications or equivalent substitutions of the technical solutions of the present invention should be encompassed within the scope of the claims of the present inven-

What is claimed is:

1. A lane line detection method using a fusion network based on an attention mechanism, comprising:

synchronously acquiring natural images and point cloud data of a road surface; and inputting the natural images and the point cloud data into a pre-built and trained fusion network to output a lane line detection result, wherein time series frames and the attention mechanism are added to the fusion network to perform information fusing on the point cloud data and the natural images;

wherein the fusion network comprises a fusion module, an Encoder module, a ConvLSTM module and a Decoder module;

the fusion module is configured to perform cross-channel fusion on the point cloud data and the natural image data by embedding an attention model, and output fused feature maps to the Encoder module;

the Encoder module is configured to extract features of the feature maps generated by the fusion module, and output the features to the ConvLSTM module;

the ConvLSTM module is configured to process the features output by the Encoder module by using a long and short-term memory network embedded with a convolutional neural network, and output the processed features to the Decoder module; and the Decoder module is configured to recover a size and a resolution of a result map by upsampling, and fuse low-level features with high-level features by Skip Connection;

wherein the fusion module comprises a point cloud branch, an image branch and a stitching unit;

the point cloud branch comprises a point cloud convolution layer, a point cloud global average pooling layer, a point cloud fusion unit, a point cloud sigmoid function and a point cloud Hadamard product unit;

the image branch comprises an image convolution layer, an image global average pooling layer, an image fusion unit, an image sigmoid function and an image Hadamard product unit;

the point cloud convolution layer is configured to keep a picture size unchanged and output a feature map R0 with a picture size of W*H, wherein W is a horizontal dimension, H is a vertical dimension, and the feature map R0 comprises C channels;

the point cloud global average pooling layer is configured to calculate an average of sum for the C channels of the feature map R0 respectively, and output an average feature map of the point cloud data, wherein a size of the average feature map is 1*1;

the point cloud fusion unit is configured to fuse the feature map output by the point cloud global average pooling layer with a feature map output by the image global average pooling layer at a same location and a same level to generate a fused feature map FRP1;

the point cloud sigmoid function is configured to input the fused feature map FRP1 into a Sigmoid excitation function to generate a feature map SFRP1;

the point cloud Hadamard product unit is configured to convert a size of the feature map SFRP1 to W*H, then calculate a Hadamard product with the feature map R0, and output a feature map1;

the image convolution layer is configured to keep a picture size unchanged and output C feature maps P0 with the picture size of W*H, wherein the feature maps P0 comprise C channels;

the image global average pooling layer is configured to calculate an average of sum for the C channels of the feature map P0 respectively, and output an average feature map of the image data, wherein a size of the average feature map is 1*1;

the image fusion unit is configured to fuse the C feature maps output by the image global average pooling layer with feature maps output by the image global average pooling layer at a same location and a same level to generate a fused feature map FRP2;

the image sigmoid function is configured to generate a feature map SFRP2 from the fused feature map FRP2 by using a Sigmoid excitation function;

the image Hadamard product unit is configured to convert a size of the feature map SFRP2 to W*H, then calculate a Hadamard product with the feature map R0, and output a feature map2; and the stitching unit is configured to perform feature map channel stitching on the feature map1 and the feature map2 to form a feature map of a size W×H×2C as an input to the Encoder module;

wherein a specific processing process of the point cloud fusion unit is:

for an $m^{th}$ channel of a point cloud fusion feature map, extracting feature maps of $m^{th}$ to $(m+k)^{th}$ channels output by the point cloud global average pooling layer and feature maps of $m^{th}$ to $(m+k)^{th}$ channels output by the image global average pooling layer, respectively, and performing fusion calculation to obtain a feature map of the $m^{th}$ channel of the point cloud fusion feature map, $$\sum_{n=1}^{k} w_r^n (y_r)_m^n + w_p^n (y_p)_m^n$$

wherein, $y_r$ is a feature map output by the image global average pooling layer, and comprises C channels with a structure of an end-to-end loop; $(y_r)_m^n$ represents a feature map of the $(m+n)^{th}$ channel; $y_p$ is a feature map output by the point cloud global average pooling layer, and comprises C channels with a structure of an end-to-end loop; $(y_p)_m^n$ represents a feature map of the $(m+n)^{th}$ channel; and $w_r^n$ represents a weight of an $n^{th}$ channel of the natural image, $w_p^n$ represents a weight of an $n^{th}$ channel of the point cloud data, m represents a feature map channel, $m \in [1,C]$, n represents the $n^{th}$ adjacent channel, and $n \in [1,k]$.

2. The lane line detection method using the fusion network based on the attention mechanism according to claim 1, wherein the Encoder module comprises three sequentially connected convolutional layers of a same structure: a first convolutional layer, a second convolutional layer and a third convolutional layer, wherein each convolutional layer comprises a convolutional kernel with a size of 3 and a stride of 2, batch normalization, an activation layer, a convolutional kernel with a size of 3 and a stride of 1, batch normalization and an activation layer; a plurality of convolutional layers with a convolution kernel of a size of 3 and a stride of 2 are designed in an Encoder part;

the Decoder module comprises three sequentially connected convolutional layers of a same structure: a fourth convolutional layer, a fifth convolutional layer and a sixth convolutional layer, wherein each convolutional layer comprises a convolutional kernel with a size of 3 and a stride of 1, batch normalization, an activation layer, a convolutional kernel with a size of 3 and a stride of 1, batch normalization, an activation layer and an upsampling layer;

features of the third convolutional layer are introduced into the fourth convolutional layer by Skip Connection; features of the second convolutional layer are introduced into the fifth convolutional layer by Skip Connection; and features of the first convolutional layer are introduced into the sixth convolutional layer by Skip Connection.

3. The lane line detection method using the fusion network based on the attention mechanism according to claim 2, wherein the ConvLSTM module comprises a ConvLSTM network and a storage unit, wherein the ConvLSTM network is the long and short-term memory network embedded with the convolutional neural network;

a soft attention mechanism is added to an input side of the ConvLSTM network, as shown below:

$$Z_t = W_z \tanh(W_{xa}X_t + W_{ha}H_{t-1} + b_a)$$

$$A_t^{ij} = \frac{\exp(z_t^{ij})}{\sum_i \sum_j \exp(z_t^{ij})}$$

$$X_t' = A_t \circ X_t$$

wherein, $X_t$ represents an input to the ConvLSTM network at a time point t, $H_{t-1}$ represents a hidden state at a time point t−1, $W_z$, $W_{xa}$ and $W_{ha}$ all represent 2-D convolution kernels, and $b_a$ represents a bias term; $Z_t$ represents a generated two-dimensional matrix; $Z_t^{ij}$ represents a value of an $i^{th}$ row and a $j^{th}$ column in the matrix $Z_t$; $A_t^{ij}$ represents a value of an $i^{th}$ row and a $j^{th}$ column of a two-dimensional score table; $A_t$ represents the two-dimensional score table; $X_t'$ represents a new input to the ConvLSTM network at the time point t through the attention mechanism, exp represents an exponential function; tanh (·) represents a hyperbolic tangent nonlinearity; and "∘" represents a Hadamard product;

the soft attention mechanism is added to an output side of the ConvLSTM network to rebuild an output gate, as follows:

$$V_t = W_o * \tanh(W_{xo}*X_t + W_{ho}*H_{t-1} + b_o)$$

$$o_t = \left\{ \frac{\exp(V_t^{ij})}{\max_i^j \exp(V_t^{ij})} \right\}$$

wherein, $o_t$ represents an output gate state; $W_{xo}$, $W_{ho}$ and $W_o$ all represent 2-D convolution kernels, $b_o$ represents a bias term, $V_t$ represents a two-dimensional matrix generated after an convolution operation, and $V_t^{ij}$ represents a value of an $i^{th}$ row and a $j^{th}$ column in the matrix $V_t$; and "*" represents convolution computation;

then activation of the ConvLSTM network at the time point t is denoted as:

$$i_t = \sigma(W_{xi} * X_t' + W_{hi} * H_{t-1} + b_i)$$

$$f_t = \sigma(W_{xf} * X_t' + W_{hf} * H_{t-1} + b_f)$$

$$o_t = \left\{ \frac{\exp(V_t^{ij})}{\max_i^j \exp(V_t^{ij})} \right\}$$

$$G_t = \tanh(W_{xc} * X_t' + W_{hc} * H_{t-1} + b_c)$$

$$C_t = f_t^{\circ} C_{t-1} + i_t^{\circ} G_t$$

$$H_t = o_t^{\circ} \tanh(C_t)$$

wherein, $C_t$, $H_t$ and $C_{t-1}$, $H_{t-1}$ represent a cell state and a hidden state at the time point t and the time point t−1, respectively; $i_t$, $f_t$ and $G_t$ represent an input gate state, a forget gate state and a candidate data storage unit, respectively; $W_{xi}$, $W_{hi}$, $W_{xf}$, $W_{hf}$, $W_{xc}$ and $W_{hc}$ all represent 2-D convolution kernels; $b_i$, $b_f$ and $b_c$ are a bias of an input gate, a bias of a forget gate and a bias of the candidate data storage unit, respectively; and σ (·) represents a Sigmoid operation; and the storage unit is configured to store feature maps of last 5 frames of a scene.

4. The lane line detection method using the fusion network based on the attention mechanism according to claim 1, further comprising a step of training the fusion network, specifically comprising:

creating a dataset containing the natural images and the point cloud data;

preprocessing the dataset, comprising:
expanding a dataset of the natural images by scale variation, random cutout, color variation and noise addition, and then performing data cleaning; and
completing point cloud images in a dataset of the point cloud data;

labeling the preprocessed dataset; and training parameters of the fusion network by using the labeled dataset to obtain a trained fusion network.

5. A terminal device, comprising a memory, a processor, and a computer program stored in the memory and operable on the processor, wherein when the processor executes the computer program, the processor implements the lane line detection method of claim 1.

6. The terminal device according to claim 5, wherein the Encoder module comprises three sequentially connected convolutional layers of a same structure: a first convolutional layer, a second convolutional layer and a third convolutional layer, wherein each convolutional layer comprises a convolutional kernel with a size of 3 and a stride of 2, batch normalization, an activation layer, a convolutional kernel with a size of 3 and a stride of 1, batch normalization and an activation layer; a plurality of convolutional layers with a convolution kernel of a size of 3 and a stride of 2 are designed in an Encoder part;

the Decoder module comprises three sequentially connected convolutional layers of a same structure: a fourth convolutional layer, a fifth convolutional layer and a sixth convolutional layer, wherein each convolutional layer comprises a convolutional kernel with a size of 3 and a stride of 1, batch normalization, an activation layer, a convolutional kernel with a size of 3 and a stride of 1, batch normalization, an activation layer and an upsampling layer;

features of the third convolutional layer are introduced into the fourth convolutional layer by Skip Connection; features of the second convolutional layer are introduced into the fifth convolutional layer by Skip Connection; and features of the first convolutional layer are introduced into the sixth convolutional layer by Skip Connection.

7. The terminal device according to claim 6, wherein the ConvLSTM module comprises a ConvLSTM network and a storage unit, wherein the ConvLSTM network is the long and short-term memory network embedded with the convolutional neural network;

a soft attention mechanism is added to an input side of the ConvLSTM network, as shown below:

$$Z_t = W_z \tanh(W_{xa} X_t + W_{ha} H_{t-1} + b_a)$$

$$A_t^{ij} = \frac{\exp(z_t^{ij})}{\sum_i \sum_j \exp(z_t^{ij})}$$

$$X_t' = A_t \circ X_t$$

wherein, $X_t$ represents an input to the ConvLSTM network at a time point t, $H_{t-1}$ represents a hidden state at a time point t−1, $W_z$, $W_{xa}$ and $W_{ha}$ all represent 2-D convolution kernels, and $b_a$ represents a bias term; $Z_t$ represents a generated two-dimensional matrix; $Z_t^{ij}$ represents a value of an $i^{th}$ row and a $j^{th}$ column in the matrix $Z_t$; $A_t^{ij}$ represents a value of an $i^{th}$ row and a $j^{th}$ column of a two-dimensional score table; $A_t$ represents the two-dimensional score table; $X_t'$ represents a new input to the ConvLSTM network at the time point t through the attention mechanism, exp represents an exponential function; tanh (·) represents a hyperbolic tangent nonlinearity; and "∘" represents a Hadamard product;

the soft attention mechanism is added to an output side of the ConvLSTM network to rebuild an output gate, as follows:

$$V_t = W_o * \tanh(W_{xo} * X_t + W_{ho} * H_{t-1} + b_o)$$

$$o_t = \left\{ \frac{\exp(V_t^{ij})}{\max_i^j \exp(V_t^{ij})} \right\}$$

wherein, $o_t$ represents an output gate state; $W_{xo}$, $W_{ho}$, and $W_o$ all represent 2-D convolution kernels, $b_o$ represents a bias term, $V_t$ represents a two-dimensional matrix generated after an convolution operation, and $V_t^{ij}$ represents a value of an $i^{th}$ row and a $j^{th}$ column in the matrix $V_t$; and "*" represents convolution computation;

then activation of the ConvLSTM network at the time point t is denoted as:

$$i_t = \sigma(W_{xi} * X_t' + W_{hi} * H_{t-1} + b_i)$$

$$f_t = \sigma(W_{xf} * X_t' + W_{hf} * H_{t-1} + b_f)$$

$$o_t = \left\{ \frac{\exp(V_t^{ij})}{\max_i^j \exp(V_t^{ij})} \right\}$$

$$G_t = \tanh(W_{xc} * X_t' + W_{hc} * H_{t-1} + b_c)$$

$$C_t = f_t \circ C_{t-1} + i_t \circ G_t$$

$$H_t = o_t \circ \tanh(C_t)$$

wherein, $C_t$, $H_t$ and $C_{t-1}$, $H_{t-1}$ represent a cell state and a hidden state at the time point t and the time point t−1, respectively; $i_t$, $f_t$ and $G_t$ represent an input gate state, a forget gate state and a candidate data storage unit, respectively; $W_{xi}$, $W_{hi}$, $W_{xf}$, $W_{hf}$, $W_{xc}$ and $W_{hc}$ all represent 2-D convolution kernels; $b_i$, $b_f$, and $b_c$ are a bias of an input gate, a bias of a forget gate and a bias of the candidate data storage unit, respectively; and a σ(·) represents a Sigmoid operation; and the storage unit is configured to store feature maps of last 5 frames of a scene.

8. The terminal device according to claim 5, further comprising a step of training the fusion network, specifically comprising:

creating a dataset containing the natural images and the point cloud data;

preprocessing the dataset, comprising:

expanding a dataset of the natural images by scale variation, random cutout, color variation and noise addition, and then performing data cleaning; and completing point cloud images in a dataset of the point cloud data;

labeling the preprocessed dataset; and training parameters of the fusion network by using the labeled dataset to obtain a trained fusion network.

* * * * *